(No Model.)

E. HOFMANN.
CARPET STRETCHER.

No. 276,406. Patented Apr. 24, 1883.

Witnesses:
W. Johnson
H. H. Taylor

Inventor:
Ernst Hofmann
Attorney.

N. PETERS. Photo-Lithographer. Washington, D. C.

UNITED STATES PATENT OFFICE.

ERNST HOFMANN, OF BARNHART'S MILLS, PENNSYLVANIA.

CARPET-STRETCHER.

SPECIFICATION forming part of Letters Patent No. 276,406, dated April 24, 1883.

Application filed March 15, 1883. (No model.)

*To all whom it may concern:*

Be it known that I, ERNST HOFMANN, a citizen of the United States of America, residing at Barnhart's Mills, in the county of Butler and State of Pennsylvania, have invented certain new and useful Improvements in Carpet Stretchers and Holders; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to devices for securing carpets in position upon floors, its object being to provide means whereby a carpet may be fastened down upon and detached from the floor expeditiously and without trouble, dispensing with tacks, nails, and similar fastenings which require to be driven through the carpet and into the floor.

My improved carpet-fastening device comprises two parts, one being a nail with a socket or eye in its head and adapted to be driven into a floor, and the other being a bow-shaped bar having sprigs or points projecting from each end and a similar sprig or point projecting from its middle. The sprigs near the ends of the bowed bar are to pierce the carpet near its edge or through its binding, and the sprig at the middle of the bar, which stands beyond the edge of the carpet, is to enter the socket or eye in the head of the nail, which is preferably driven into the floor close to the washboard. The nails are to be driven all around the edge of the floor—say about eight inches apart—and a similar number of bowed bars are used.

Figure 1:
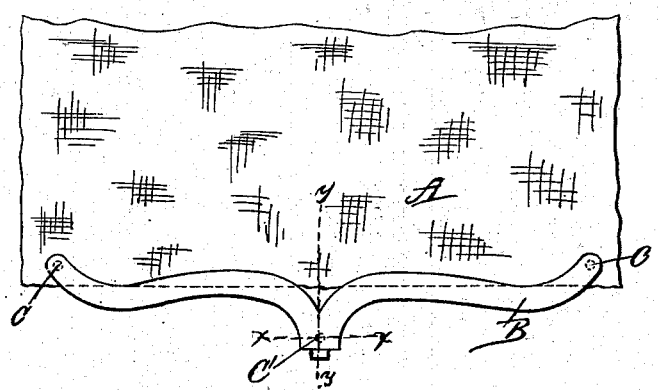
Figure 5:
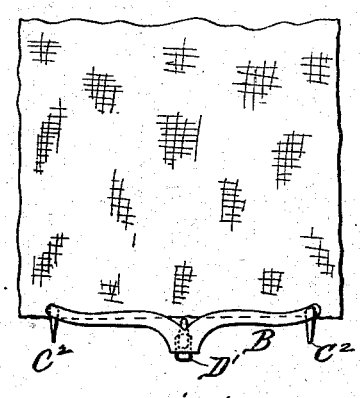
Figure 2:
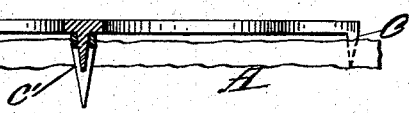
Figure 6:
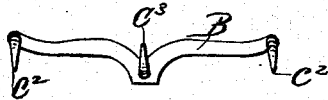
Figure 4:
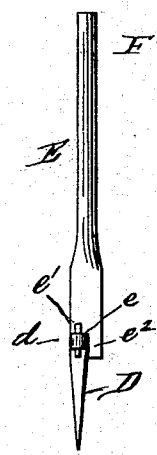
Figures 3, 7:
Figure 8:
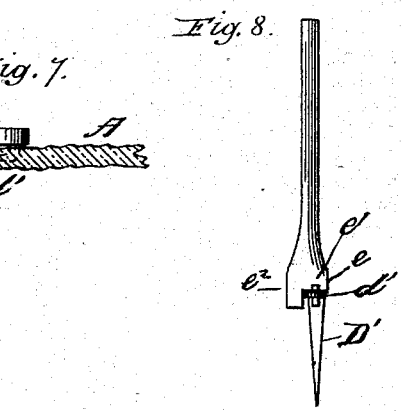

The invention will be fully understood by the accompanying drawings, in which Figure 1 is a top view of my invention as applied to a carpet. Fig. 2 is a section of the device on the line $x\,x$ of Fig. 1, the edge of the carpet being shown in full lines. Fig. 3 is a section on the line $y\,y$, Fig. 1. Fig. 4 is a view of the device used for driving the nails. Fig. 5 is a top view of a modified form of my invention as applied to a carpet. Fig. 6 is a bottom view of the modified fastening-bar. Fig. 7 is a section on the line $g\,g$, Fig. 5. Fig. 8 is a driving device suitable for driving the nails to be used in the modified form of the invention.

Referring to Figs. 1 and 2, A indicates a portion of a carpet. B is a bow-shaped metallic bar, having sprigs or points C C projecting from its ends, and a similar point, C', projecting in the same direction, in its back or middle portion. D is a nail, having a head, $d$, projecting to one side and pierced to receive the point C' at the back or middle of a fastening-bar, B. These nails, as before stated, are to be driven around the edge of the floor close to the washboard, with their heads projecting inwardly. The points at the ends of a suitable number of the bowed bars B being forced through the carpet near its edge, or through its binding, with the backs or middle portions of the bars projecting beyond the edge of the carpet, the latter is properly stretched, and the points C' at the middle of the bars are inserted in the sockets or eyes of the nail-heads. The nails are to be left in the floor, and it is obvious that the carpet may be readily taken up by simply disengaging the points C' from the nails, and the bars will be removed from the carpet while it is being shaken or packed away, and readily again applied thereto when it is desired to put the carpet down.

The only difference in the modifications shown in Figs. 5, 6, and 7 is that the bow-shaped bar is provided with hooks $C^2\,C^2$ at its ends and a similar hook, $C^3$, at its middle, the hook $C^3$ being bent inwardly with respect to the bow, and the hook $C^2$ being bent in an opposite direction. The nail D', used for this modified form of the invention, has a somewhat thinner head than the nail D, and this thin head is allowed to stand at a little distance from the floor, in order that the central hook, $C^3$, may extend under it after passing through its eye, as shown in Fig. 7.

In driving the nails into the floor I use a driving-bar, E, which has a shoulder, $e$, to rest upon the head of the nail, while a pin, $c'$, extends through the head of the nail, and a lug, $e^2$, stands along one side thereof to hold it steady. By driving on the top of the tool E with a hammer the nails are conveniently and rapidly set into the floor.

Having now fully described my invention, what I claim is—

1. The two-part carpet-fastener herein described, consisting of the bow-shaped bar provided with sprigs or points projecting from its two ends and center, respectively, and the nail having a socket or eye in its head, substantially as described.

2. The carpet-fastener consisting of a bow-shaped bar having the sprigs or points at its two ends and center, respectively, the point at the center being bent inwardly with respect to the bow, while the points at the ends are bent in an opposite direction, and the nail having a thin laterally-projecting head with an eye formed in it, substantially as described.

In testimony whereof I affix my signature in presence of two witnesses.

ERNST HOFMANN.

Witnesses:
HENRY STAHL,
PETER NIESEN.